United States Patent [19]

Bonfils

[11] Patent Number: 4,472,976
[45] Date of Patent: Sep. 25, 1984

[54] APPARATUS FOR MEASURING AT LEAST ONE COMPONENT OF THE FORCES APPLIED TO A BEAM

[75] Inventor: Georges L. Bonfils, St. Gervais-Les-3-Clochers, France

[73] Assignee: Sfena-Ste Francaise d'Equipements pour la Navigation Aerienne, Velizy-Villacoublay, France

[21] Appl. No.: 280,267

[22] Filed: Jul. 2, 1981

[30] Foreign Application Priority Data

Jul. 21, 1980 [FR] France ............................... 80 16046

[51] Int. Cl.³ ........................... G01L 1/00; G01L 5/16
[52] U.S. Cl. .................................. 73/862.62; 73/781; 73/862.04; 73/862.64
[58] Field of Search ........... 73/862.04, 862.38, 862.62, 73/862.64, 779–782, 855; 33/147 D

[56] References Cited

U.S. PATENT DOCUMENTS 3,426,586 2/1969 Kadlec ............................. 73/781 X
3,729,985 5/1973 Sikorra ............................... 73/780
3,992,933 11/1976 Randolph, Jr. .................. 73/862.62

FOREIGN PATENT DOCUMENTS 681334 8/1979 U.S.S.R. ......................... 73/862.62

Primary Examiner—Charles A. Ruehl
Attorney, Agent, or Firm—Browdy and Neimark

[57] ABSTRACT

Apparatus for measuring at least one component of the forces applied to a beam comprises supports at a pair of spaced locations along the beam, each support having an arm, the arms extending axially toward each other. One arm carries a displacement sensor and the other arm carries a transmission element coupled to the moveable part of the displacement sensor. Each support represents arbitrary points d and e, and measurement of the component parallel to a straight line through the displacements of the point d with respect to the point e makes it possible to obtain the above-mentioned component. This result is independent of the position of the resultant of the forces applied to the beam with respect to the point of measurement.

8 Claims, 7 Drawing Figures

APPARATUS FOR MEASURING AT LEAST ONE COMPONENT OF THE FORCES APPLIED TO A BEAM

BACKGROUND OF THE INVENTION

The present invention concerns a process and apparatus for measuring at least one component of the forces applied to a beam of any shape, on one side or the other of a given portion of the beam.

Generally, it is known that, for the purpose of taking such a measurement, apparatuses have already been proposed, which use at least one sensor or pick-up adapted to detect relative movements of at least one pair of points which are fixed with respect to the beam at each of the ends of the portion of the beam.

However, these apparatuses have not made it possible to achieve the results envisaged, because they are generally responsive not only to the component of the forces to be measured, but also the position of that component with respect to the point of measurement.

OBJECT AND SUMMARY OF THE INVENTION

The aim of the present invention is to overcome this disadvantage by establishing the particular conditions which must be achieved in order to carry out the measurement operation and in particular the position of the plane in which the above-mentioned pairs of points must be disposed.

For this purpose, the process to be carried out using the apparatus of the invention comprises more particularly:

(1) Selecting in the beam a portion T which is limited by two planes A and B which are perpendicular to the neutral axis at respective points a and b, said portion also being determined in such a manner that:
 the neutral axis thereof is substantially rectilinear,
 the ellipses of inertia of its cross sections are close to circularity, and
 the forces which are applied thereto, excluding those which are transmitted thereto by the remainder of the beam, cause negligible displacements of the section A with respect to the section B;

(2) Selecting a predetermined straight line $\alpha$, in a plane D perpendicular to $\overline{ab}$ and, in said plane D on at least one predetermined line $\beta$ parallel to the straight line $\alpha$, selecting a group of two points d and e disposed on the straight line $\beta$ in the absence of forces applied to the beam, the plane D passing through a straight line $\Delta$ which is the instantaneous axis of rotation of the plane B with respect to the plane A when the forces applied to the beam outside of the portion T, beyond the plane B, are reduced to a couple of moment perpendicular to $\overline{ab}$;

(3) Making the point d fixed with respect to the plane A of the beam and the point e fixed with respect to the plane B of the beam (or vice-versa), the connections being such that the relative displacements of the point d with respect to the point e parallel to the plane B show negligible hysteresis when the beam is subjected to repeated forces;

(4) Measuring the component parallel to the straight line $\alpha$ of the relative displacements of the point d with respect to the point e for each group of two points; and (5) Deducing from the result of at least one of said measurements, the component along $\overline{ab}$ of the moment m of the resultant couple at point b of the forces applied to the beam outside of the portion T beyond the plane B and/or the component f in at least one direction $\alpha$ of the resultant F of the forces applied to the beam on the same side of the portion T.

This result is due to the fact that the measured displacement, when the straight line $\beta$ is at a distance c from the neutral axis $\overline{ab}$ is of the form:

$$\epsilon = K_1 \cdot f + K_2 \cdot c \cdot m$$

in which relationship:

$K_1$ and $K_2$ are coefficients resulting from the dimensions and the material of the beam in the portion T.

Thus, when the component f in a predetermined one of the directions $\alpha$ of the resultant force F of the forces applied to the beam, outside the portion T, beyond the plane B, is to be obtained by a single measurement, it is sufficient for the straight line $\beta$ to be caused to meet the axis $\overline{ab}$.

For the purposes of determining the parameters c and m, it is also possible to use a plurality of pairs of points d and e which are movable along a plurality of parallel lines $\beta$ disposed at distances $c_n$ from $\overline{ab}$, which are algebraically different, for at least one of the directions $\alpha$, in order to obtain redundant linear functions of the following form:

$$\epsilon_n = K_1 f + K_2 c_n \cdot m$$

$\epsilon_n$ being the respective displacements of the n pairs of points d and e.

The present invention thus comprises an apparatus for carrying out the above-described process, the apparatus including a first rigid member connected to the section A of the beam, a second rigid member connected to the section B of the beam, pick-ups for sensing rectilinear displacement, of conventional design (resistive, capacitive, inductive, optical, etc) corresponding to each group of points d and e, the body of which is connected to one of said two members and the movable part to the other member, the measurement axis being placed on the straight line $\overline{de}$.

Further, in accordance with the invention, the connection between the movable part and the corresponding point d or e of at least one pick-up is made by means of a link which is pivotally connected without play (resilient pivot joints produced for example by thinning down the ends of the link), said link being of substantial length with respect to the possible transverse displacements relative to the corresponding straight line $\beta$ of points d and e, when forces are applied to the beam.

BRIEF DESCRIPTION OF THE DRAWINGS

Embodiments of the invention will be described hereinafter by way of non-limiting example with reference to the accompanying drawings in which.

DETAILED DESCRIPTION OF THE INVENTION

Figure 1:
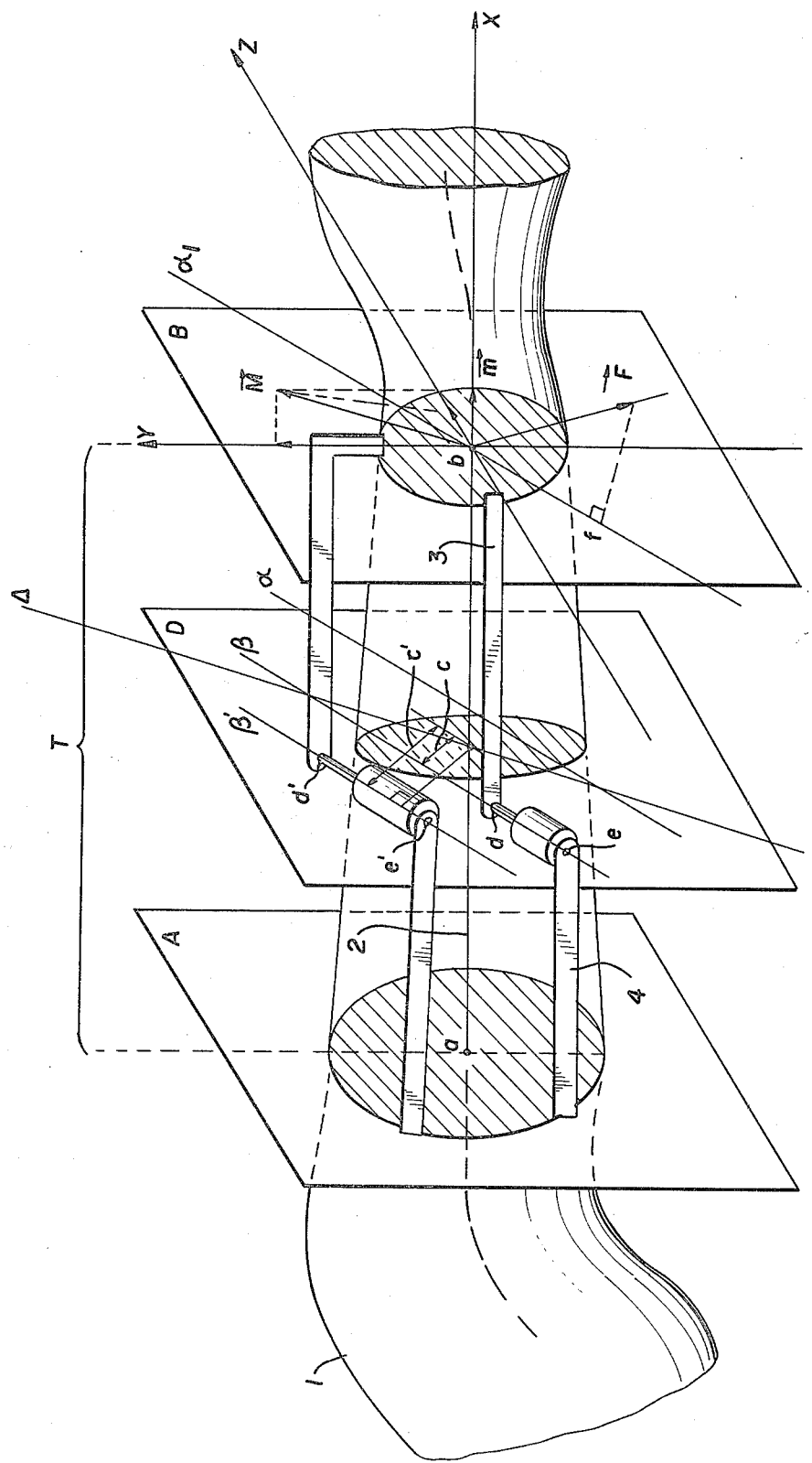
FIG. 1 is a diagrammatic perspective view of a beam and the different parameters involved in the process and the apparatus for measuring the forces applied to the beam.

In the example shown in FIG. 1, the beam 1, of any shape whatever, has in its central part a portion T comprising a substantially rectilinear neutral fiber or axis 2 limited by two planes, A and B, which are respectively perpendicular to the neutral axis 2 at points a and b.

It will be recalled that the aim of the invention is to determine, in the above-described beam:

on the one hand, the component along axis X passing through points a and b of the moment m of the resultant couple $\vec{M}$ at point b of the forces applied to the beam outside of the portion T, on the other side of the plane B and/or on the other hand, the component f in at least one direction $\alpha_1$ of the resultant force $\vec{F}$ of the forces applied to the beam, on the same side of the portion T.

For this purpose, there is determined a plane D passing through a straight line $\Delta$ which is the instantaneous axis of rotation of the plane B with respect to the plane A when the forces applied to the beam outside of the portion T, on the other side of the plane B, are reduced to a couple of moment perpendicular to the segment $\overline{ab}$.

There is then selected in the plane D, a predetermined straight line $\alpha$ in the same directions as $\alpha_1$, and then, on at least one line $\beta$ parallel to the straight line $\alpha$, a pair of points d and e which are fixed with respect to the planes A and B respectively by means of rigid connections 3 and 4 which are disposed outside of the material of the beam and therefore outside the beam, in the case of a solid beam, or possibly in the interior of the beam, when the beam is hollow.

As mentioned hereinbefore, the components f and m are deduced from measurement of the component parallel to the straight line $\alpha$ in respect of the relative displacements of the point d with respect to the point e, for each group of points (d,e).

This results from the fact that the measured displacement $\epsilon$, when the straight line $\beta$ is at a distance c from the neutral axis 2, is of the following form:

$$\epsilon = K_1 f + K_2 \cdot c \cdot m \quad (1)$$

in which $K_1$ and $K_2$ are coefficients resulting from the dimensions and the material of the beam in the portion T.

Thus, if a straight line $\beta$ passing through the neutral axis is selected, the distance c is zero and the expression (1) becomes:

$$\epsilon = K_1 f. \quad (2)$$

that is to say, the component f is directly proportional to the displacement $\epsilon$.

On the other hand, if the components m and f are to be obtained at the same time, it is then necessary to involve at least two pairs of points d, e and d', e' which are respectively carried by axes $\beta$ and $\beta'$ which are parallel to the straight line $\alpha$ and which are disposed in the plane D.

This therefore gives two values $\epsilon$ and $\epsilon'$ which are linear functions of the following form:

$$\epsilon = K_1 F + K_2 c \, m \quad \text{(axis } \beta\text{)}$$

$$\epsilon' = K_1 f + K_2 c' \, m' \quad \text{(axis } \beta'\text{)}$$

in which c' is the distance of the axis $\beta'$ from the neutral axis.

From these two equations, it is then easy to obtain the components m and f.

It is clear that, in order to increase the reliability of that result, it is possible to use n pairs of points d and e carried by n parallel lines $\beta$ so as to obtain n redundant linear functions of the form:

$$\beta_n = K_1 f + K_2 c_n m$$

from which the values of the components f and m are obtained.

Figure 2:
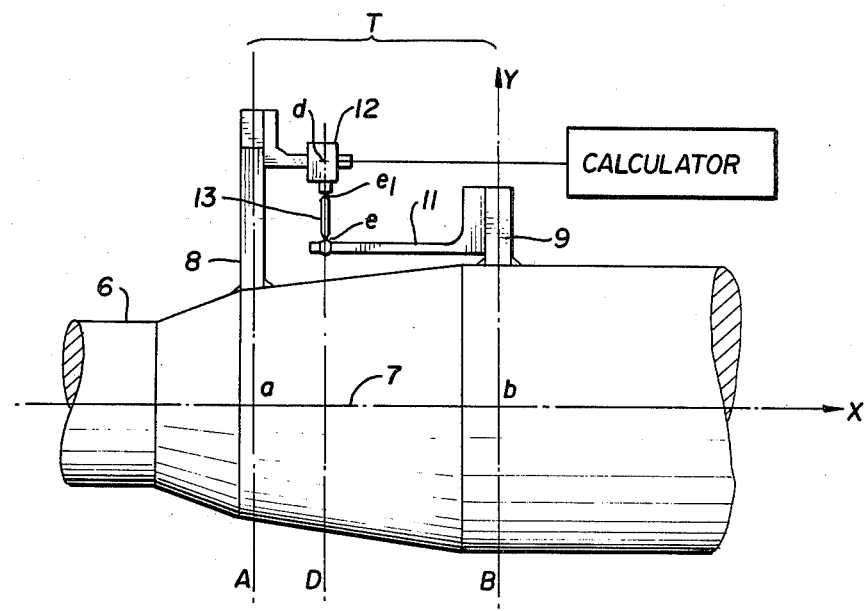
FIGS. 2 and 3 are views in longitudinal section and in cross-section respectively of a measuring apparatus in which the movement detector is disposed outside the beam.
Figure 3:
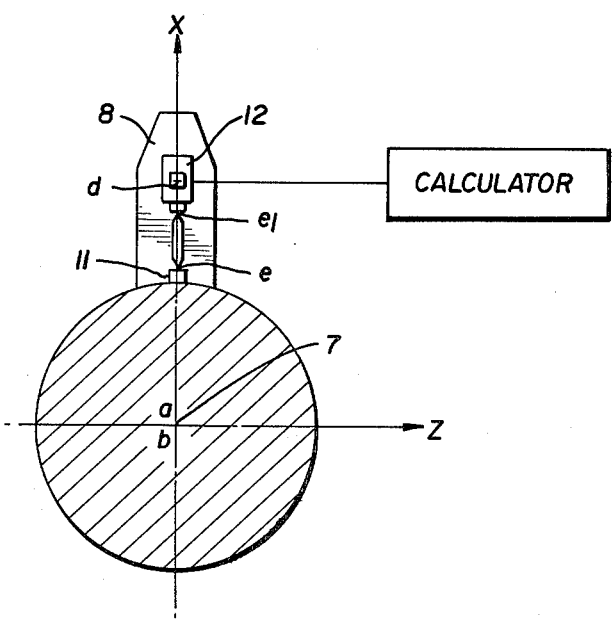

In the example shown in FIGS. 2 and 3, the beam 6 on which measurement of the components f and m is to be effected is solid and consequently the line $\beta$ carrying the points d and e is selected to be outside the beam 6. In this example, the planes A and B delimiting the portion T in which the neutral axis 7 is rectilinear are embodied by two supports 8 and 9 which are respectively fixed to the beam 6 at the location of the two planes A and B.

Fixed on each of the supports 8 and 9 is an arm 10 and 11 extending axially towards each other, one arm 10 carrying at its end the body 12 of a displacement pick-up or sensor and the other arm 11 carrying a transmission element 13 connected to the movable part of the pick-up.

The transmission element 13 may advantageously be in the form of a link which, in the vicinity of each of its ends, has a play-free pivot connection e and $e_1$ (being a pivot produced by thinning down the link at the selected positions), the points d and e being respectively embodied by the pivot connection e and by a reference point connected to the body 12 of the pick-up. The link must necessarily be of substantial length with respect to the possible relative transverse displacements with respect to the line $\beta$ when the forces are applied to the beam 6.

This arrangement makes it possible to avoid measurement errors and transverse stresses in the pick-up if the pick-up is not specifically designed to eliminate them.

Figure 4:
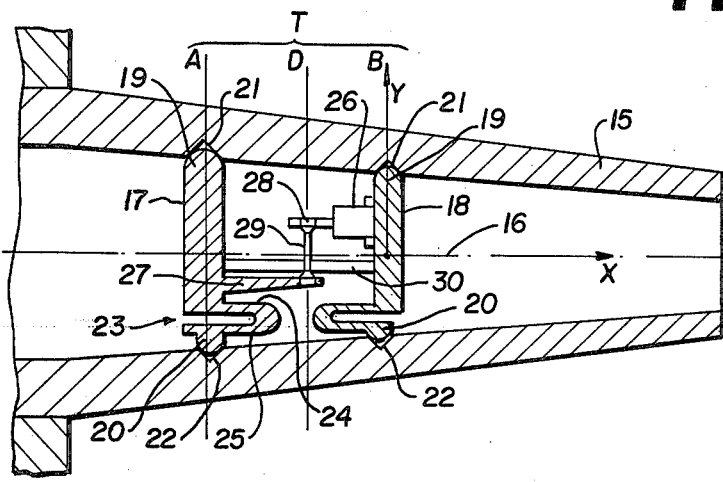
FIGS. 4 and 5 are views in section in plane XY (FIG. 4) and in plane ZX (FIG. 5) of a measuring device in which the movement detector is disposed inside the beam.
Figure 5:
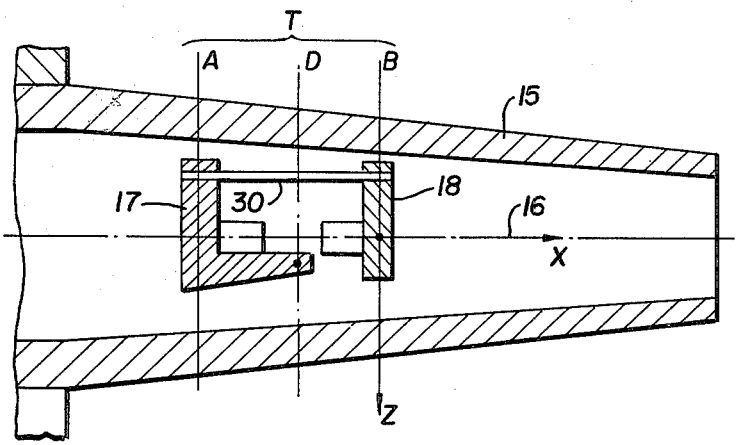

Referring now to FIGS. 4 and 5, the measuring apparatus is disposed within a portion of a hollow beam 15, in which portion the neutral axis 16 is substantially rectilinear. The portion T is delimited by two parallel planes A and B which are perpendicular to the neutral axis 16 and which pass through the fixing points of two transverse elements 17 and 18 which are mounted within the beam 15.

In the embodiment illustrated, the above-mentioned fixing points are the centers of two hemispherical protruberances 19 and 20 which are provided at two opposite points on the periphery of each of the transverse elements 17 and 18 and which respectively engage into two conical millings provided in the inside wall surface of the beam 15.

To permit the two hemispherical protruberances 19 and 20 to be engaged into their respective millings 21 and 22, one of them is mounted on the transverse element 17, 18 by way of a resilient element 23 which may comprise for example a U-shaped spring member which has one of its limbs, at 24, fixed with respect to the transverse element 17, 18 while the other limb 25 of the spring carries the above-mentioned protruberance 20.

Mounted on one of the transverse elements 17 and 18 is the body of a pick-up provided for detecting the rotational displacements of its rod which is movable in a plane perpendicular to the plane D and passing through the points d and e.

The other transverse element comprises an arm 27 which is connected by way of its end to the movable rod 28, by way of a transmission element 29 of the type described hereinbefore.

In order to avoid any possibility of manifest relative rotation of the transverse elements 17 and 18 about the axes joining their respective two fixing points, the two elements are also connected by means of a connecting member 30 which is resilient in a bending mode.

Figure 6:
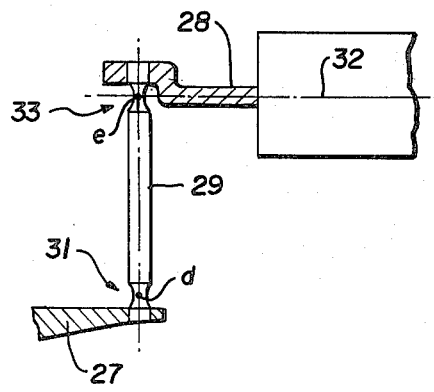
FIGS. 6 and 7 are diagrammatic views on a larger scale of the movement detector in two different positions.
Figure 7:
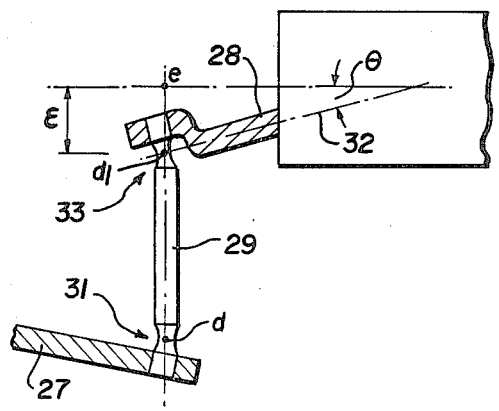

The mode of operation of this apparatus will be more clearly apparent from FIGS. 6 and 7.

In the rest condition (see FIG. 6), the transmission element 29 has its axis in the plane D, with the points d and e being embodied on the one hand by the resilient hinge means 31 and on the other hand by the intersection of the axis 32 of the pick-up with the axis of the element 29, that is to say, in the embodiment illustrated in FIG. 6, by the position of the hinge means 33.

When it is subjected to forces, the beam 15 is deformed, thus causing changes in position and inclination of the plane B with respect to the plane A and consequently relative displacement $\epsilon$ of the point d with respect to the point e, which is revealed by rotation through an angle $\theta$ of the rod of the pick-up with respect to the body thereof.

It will be appreciated that this mode of operation is made possible only by virtue of the play-free pivot connection effect of the resilient hinge means 31 and 33.

I claim:

1. Apparatus for measuring at least one component of the forces applied to a beam, on one side or the other of a portion T of said beam, and in which:

the portion T is selected in such a way that on the one hand the neutral axis thereof is substantially rectilinear, said portion being limited by two planes A and B which are perpendicular to the neutral axis at points a and b respectively and, on the other hand, the ellipses of inertia of the cross sections of T are close to circularity, and so that in addition the forces which are applied thereto, except those which are transmitted thereto by the remainder of the beam, cause negligible displacements of the section A with respect to the section B;

there is selected at least one predetermined straight line $\alpha$, in a plane D perpendicular to a segment $\overline{ab}$ connecting points a and b and, in said plane D, on at least one predetermined straight line $\beta$ parallel to the straight line $\alpha$, selecting a group of two points d and e disposed on the straight line $\beta$ in the absence of forces applied to the beam, the plane D passing through a straight line $\Delta$ which is the instantaneous axis of rotation of the plane B with respect to the plane A when the forces applied to the beam outside of the portion T, beyond the plane B, are reduced to a couple of moment m perpendicular to segment $\overline{ab}$;

the apparatus being characterized in that it comprises means for connecting the point d with respect to the plane A of the beam and the point e with respect to the plane B of the beam, the connecting means being such that the relative displacements of the point d with respect to the point e parallel to B show negligible hysteresis when the bean is subjected to repeated forces; and at least one sensor, including a body and a moveable part, for measuring the component parallel to the corresponding straight line $\alpha$ of the relative displacements of the point d with respect to the point e for each group of two points;

whereby the result of at least one of said measurements permit deducing the component along segment $\overline{ab}$ of the moment m of the resultant couple at point b of the forces applied to the beam outside of the portion T beyond the plane B and/or the component f in at least one direction $\alpha_1$ parallel to the straight line $\alpha$ of the resultant force of the forces applied to the beam on the same side of the portion T.

2. Apparatus according to claim 1 which makes it possible, by means of a single measurement, to obtain the component f in a direction $\alpha_1$ parallel to the straight line $\alpha$ of the resultant force F of the forces applied to the beam, outside of a portion T, beyond the plane B, characterized in that it comprises at least one sensor associated with a single pair of points d and e which are so positioned that the straight line $\beta$ meets the axis of the segment $\overline{ab}$.

3. Apparatus according to claim 1 comprising a plurality of sensors associated with a plurality of pairs of points d and e which are associated with a plurality of parallel lines $\beta$ disposed at distances $c_n$ from the segment $\overline{ab}$, which are algebraically different, for a direction $\alpha_1$ parallel to the straight line $\alpha$, in order to produce redundant linear functions of the form:

$$\epsilon_n = K_1 f + K_2 c_n \cdot m$$

whereby the values of f and m may be obtained from said functions, $\epsilon_n$ being the relative displacement of the $n^{th}$ pair of points d and e, $K_1$ and $K_2$ being coefficients resulting from the dimensions and the material of the beam in the portion T, and $c_n$ being the distance from the neutral axis of the $n^{th}$ parallel line $\beta$.

4. Apparatus according to claim 1 characterized in that the connection between the movable part and the corresponding point d or e of at least one sensor is made by means of a link which is pivotally connected without play and the resilient pivot connections of which are produced for example by thinning down the ends of the link, said link being of substantial length with respect to the possible transverse displacements relative to the corresponding straight line $\beta$ of points d and e, when forces are applied to the beam.

5. Apparatus according to claim 1 for measuring at least one component of the forces applied to said beam on respective sides of said portion T, wherein said beam is hollow and the two planes A and B are embodied by two connecting means consisting of two transverse elements which are mounted within the beam, one of which carrying the body of a displacement sensor, the other being connected to a movable rod coupled to said sensor by way of a transmission element which has its axis on a parallel to one of said transverse elements.

6. Apparatus according to claim 5 characterized in that said fixing points comprise at least two hemispherical protruberances 19 and 20 which are provided at the periphery of each of the transverse elements 17 and 18 and which respectively engage into corresponding rotationally symmetrical recesses 21 at 22 which are provided in the wall of the beam and which are preferably conical.

7. Apparatus according to claim 5 characterized in that said transverse elements are connected by means of at least one connecting member which is resilient in a bending mode.

8. Apparatus for measuring at least one component of the forces applied to a beam at a portion in which the neutral axis thereof is substantially rectilinear, comprising:

a first element in a first plane disposed transverse to said neutral axis, a second element in a second plane disposed transverse to said neutral axis in substantial alignment with said first element.

said first and second elements each including an arm disposed normal thereto, said first element arm extending toward said second element, and said second element arm extending toward said first element, one of said first and second elements carrying a displacement sensor on, and comprising a rod movable relative to, its arm;

and a third element coupling the arm of the other of said first and second elements at a first point with said moveable rod at a second point, said third element being disposed substantially normal to said neutral axis before the application of said forces to said beam, whereby when said forces are applied to said beam, said at least one component of said applied forces may be determined by measuring the relative displacement between the second point when the beam is deformed and the first point when the beam is undeformed, and thereby determining the relative changes in position and inclination between the first plane and the second plane.

* * * * *